L. H. Shular,
Plow Tender.

No. 94,784. Patented Sep. 14, 1869.

C. M. Sappenfield
Wm. K. Lyman
Witnesses.

Lewis H. Shular
Inventor

UNITED STATES PATENT OFFICE.

LEWIS H. SHULAR, OF CRAWFORDSVILLE, INDIANA.

IMPROVEMENT IN CLOD-FENDERS FOR GROWING PLANTS.

Specification forming part of Letters Patent No. 94,784, dated September 14, 1869.

*To all whom it may concern:*

Be it known that I, LEWIS H. SHULAR, of Crawfordsville, in the county of Montgomery and State of Indiana, have invented a new and Improved Method for Fending Corn or Growing Plants while being Cultivated; and I do hereby declare that the following is a full, clear, and exact description of the same, reference being had to the annexed drawings, making a part of this specification, in which—

Figure 1:
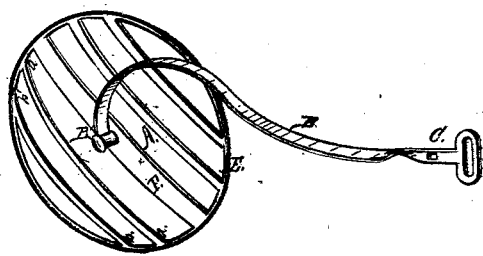
Figure 2:
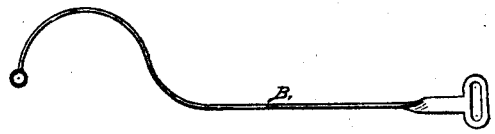

Figure 1 represents a perspective view of my self-adjustable rolling or circular clod-fender. Fig. 2 represents adjustable spring of same.

A in Fig. 1 represents my circular or rolling fender; B, the adjustable spring, attached to the fender at B', and to the plow-beam at C.

D represents cross-bars of fender, attached to the rim at $a\ a'$, $b\ b'$, &c.; E, rim; F, large bar.

B in Fig. 2 represents my spring detached, as viewed horizontally.

My invention consists in a rim fourteen inches (more or less) in diameter, and a curved spring thirty inches in length. The rim has bars running parallel and attached to said rim at their several ends.

I do not limit myself to any certain size of wheel, or material of which it may be constructed; nor do I limit myself to any particular mode of fastening the bars to said rim; but

What I claim as new, and desire to secure by Letters Patent of the United States, is—

The parts, as represented and described herein, and shown by parts A, B, B', C, D, E, F, $a\ a'$, and $b\ b'$, substantially as herein set forth.

LEWIS H. SHULAR.

Witnesses:
C. W. SAPPENFIELD,
WM. H. LYNN.